(12) United States Patent
Matsumoto

(10) Patent No.: US 9,527,357 B2
(45) Date of Patent: Dec. 27, 2016

(54) TRUNNION SUSPENSION STRUCTURE

(71) Applicant: HINO MOTORS, LTD., Hino-shi (JP)

(72) Inventor: Kouji Matsumoto, Tokyo (JP)

(73) Assignee: HINO MOTORS, LTD., Hino-shi (JP)

( * ) Notice: Subject to any disclaimer, the term of this patent is extended or adjusted under 35 U.S.C. 154(b) by 0 days.

(21) Appl. No.: 14/654,959

(22) PCT Filed: Dec. 26, 2013

(86) PCT No.: PCT/JP2013/007629
§ 371 (c)(1),
(2) Date: Jun. 23, 2015

(87) PCT Pub. No.: WO2014/108978
PCT Pub. Date: Jul. 17, 2014

(65) Prior Publication Data
US 2015/0343869 A1    Dec. 3, 2015

(30) Foreign Application Priority Data
Jan. 11, 2013  (JP) ................................ 2013-003795

(51) Int. Cl.
*B60G 5/053* (2006.01)
*B60G 11/04* (2006.01)

(52) U.S. Cl.
CPC ............. *B60G 5/053* (2013.01); *B60G 11/04* (2013.01); *B60G 2204/121* (2013.01); *B60G 2204/4302* (2013.01); *B60G 2206/601* (2013.01)

(58) Field of Classification Search
CPC .... B60G 5/053; B60G 11/04; B60G 2204/121
USPC ................................................. 280/680, 686
See application file for complete search history.

(56) References Cited

U.S. PATENT DOCUMENTS

| 3,117,772 | A | * | 1/1964 | Brown | B60G 5/053 267/269 |
|---|---|---|---|---|---|
| 4,245,852 | A | * | 1/1981 | Lie | B60G 5/053 280/680 |
| 4,278,271 | A | * | 7/1981 | Raidel | B60G 9/003 267/219 |
| 5,676,356 | A | * | 10/1997 | Ekonen | B60G 5/053 248/634 |
| 8,342,565 | B2 | * | 1/2013 | Hata | B60G 5/053 280/124.11 |

(Continued)

FOREIGN PATENT DOCUMENTS

| DE | 4309004 A1 * | 9/1994 | ............. B60G 5/053 |
|---|---|---|---|
| EP | 697297 A2 * | 7/1995 | ............. B60G 5/053 |

(Continued)

OTHER PUBLICATIONS

International Search Report Issued Feb. 18, 2014 in PCT/JP13/007629 Filed Dec. 26, 2013.

*Primary Examiner* — Ruth Ilan
(74) *Attorney, Agent, or Firm* — Oblon, McClelland, Maier & Neustadt, L.L.P.

(57) ABSTRACT

A trunnion bracket 4 mounted through fastening members 16 on a lower surface of each of opposite ends of a cross member 10 laterally of a vehicle is integrally formed with a trunnion plate part 4b which extends and stands upward from an outer surface of the trunnion bracket 4 and is mounted on an outer surface of a web 5a of a frame 5 through fastening members 17.

2 Claims, 7 Drawing Sheets

(56) References Cited

U.S. PATENT DOCUMENTS

2003/0047906 A1* 3/2003 Hicks ................... B60G 7/02
                                                      280/433
2011/0148065 A1   6/2011 Hata

FOREIGN PATENT DOCUMENTS

| EP | 2275290 A1 * | 1/2011 | ............... B60G 5/03 |
| FR | 1296474 A * | 6/1962 | ............... B60G 5/03 |
| JP | 63-155806 U | 10/1988 | |
| JP | 2-151579 A | 6/1990 | |
| JP | 11-278027 A | 10/1999 | |
| JP | 2010-52540 A | 3/2010 | |

* cited by examiner

LATERAL DIRECTION OF VEHICLE

TRUNNION SUSPENSION STRUCTURE

TECHNICAL FIELD

The present invention relates to a trunnion suspension structure.

BACKGROUND ART

Generally employed in a vehicle such as a rear two-axle heavy-duty truck is a so-called trunnion suspension which is a suspension intended for exclusive use with axles in tandem.

FIGS. 1-5 show an example of a conventional trunnion suspension structure in which a pair of axles 1 and 2 are arranged in tandem with a required space longitudinally of a vehicle, a trunnion shaft 3 being arranged therebetween and fixed through trunnion brackets 4 to a frame 5. Pivotally mounted on the trunnion shaft 3 are central portions of leaf springs 6 through pivotal bases 7. The front and back axles 1 and 2 are respectively supported by opposite ends of the leaf springs 6 and are kept in position longitudinally of the vehicle by upper and lower rods 8 and 9.

A cross member 10 laterally bridges over the frame 5 for reinforcement at the fixed positions of the trunnion brackets 4 to the frame 5. The upper rods 8 connect front and rear surfaces on a central portion of the cross member 10 with upper surfaces on central portions of the axles 1 and 2, respectively; the lower rods 9 connect front and rear surface on lower portions of the trunnion brackets 4 with lower portions of opposite ends of the axles 1 and 2, respectively.

In the trunnion suspension structure, vertical movements of the front and back axle 1 and 2 are absorbed by the leaf springs 6, and longitudinal forces are transmitted through the upper and lower rods 8 and 9 to the frame 5. When the rear wheels of the vehicle are to step over a difference in level, satisfactory stepping-over is realized by pivotal movements of the leaf springs 6 about the trunnion shaft 3.

In the figures, reference numeral 11 denotes U bolts for fixing the central portion of the leaf spring 6 to the pivotal base 7; 12, mounting parts on the front and rear surfaces on the central portion of the cross member 10, respectively, for mounting of the upper rods 8; 13, mounting parts on the upper surfaces on the axles 1 and 2, respectively, for mounting of the upper rods 8; 14, mounting parts on the front and rear surfaces of the lower portions of the trunnion brackets 4, respectively, for mounting of the lower rods 9; and 15, mounting parts on the lower portions of the opposite ends of the axles 1 and 2, respectively, for mounting of the lower rods 9.

There exists, for example, the following Patent Literature 1 as conventional art document pertinent to a trunnion suspension structure as mentioned in the above.

CITATION LIST

Patent Literature

[Patent Literature 1] JPH 11-278027A

SUMMARY OF INVENTION

Technical Problems

In the conventional trunnion suspension structure as shown in FIGS. 1-5, the frame 5 is constituted by channel steels each with a web 5a and flanges 5b; the channel steels are spaced apart with a required space laterally of the vehicle such that channels of the channel steels face with each other. The trunnion bracket 4 is mounted on the flange 5b of the frame 5 using fastening members such as bolts and nuts, so that holes for the fastening members have to be formed on the flange 5b of the frame 5.

However, in the frame 5 constituted by the channel steels with their cross-sectional secondary moments being enhanced mainly by the flanges 5b, it is not so desirable to form holes for fastening members on the flanges 5b of the frame 5; there is room for improvement in this respect.

The invention was made in view of the above and has its object to provide a trunnion suspension structure in which trunnion brackets respectively mounted on webs of a frame to eliminate the necessity of any holes for fastening members on flanges of the frame and employment of closed cross-section structures can substantially enhance whole rigidity, improve reliability, avoid increase in number of parts required through reduction in size and weight of the trunnion brackets and attain reduction in cost.

Solution to Problems

The invention is directed to a trunnion suspension structure comprising a cross member bridging over a frame constituted by channel steels spaced apart laterally of a vehicle such that channels of said channel steels face with each other, trunnion brackets mounted on lower surfaces of opposite ends of said cross member laterally of the vehicle through fastening members, respectively, a trunnion shaft arranged to bridge over boss parts of said trunnion brackets and having opposite ends respectively projecting outward from said boss parts, central portions of leaf springs being pivotably mounted on said opposite ends of the trunnion shaft through pivotal bases, respectively, each of said trunnion brackets being integrally formed with a trunnion plate part extending upward from an outer surface of said trunnion bracket and mounted on an outer surface of a web of said frame through fastening members, a first closed cross-section structure being provided longitudinally of the cross member and laterally of the vehicle by said cross member, the frame, the trunnion plate parts, the trunnion brackets and the trunnion shaft, a second closed cross-section structure being provided at each of the opposite ends of said cross member laterally of the vehicle by the end of said cross member, the frame, the trunnion plate part and the trunnion bracket.

According to the above-mentioned means, following operations will be obtained.

Unlike the conventional trunnion suspension structure, the fact that the trunnion plate parts of the trunnion brackets are respectively mounted, as mentioned in the above, through the fastening members on the outer surfaces on the webs of the frame which in turn is constituted by channel steels each having the web and flanges and spaced apart from each other laterally of the vehicle such that channels of the channel steels face with each other, makes it unnecessary to respectively mount the trunnion brackets to the flanges of the frame through fastening members such as bolts and nuts, so that there needs no more holes for the fastening members on the flanges of the frame.

Moreover, the fact that the first closed cross-section structure is provided longitudinally of the cross member and laterally of the vehicle by the cross member, the frame, the trunnion plate parts, the trunnion brackets and the trunnion shaft and the second closed cross-section structures is provided, at each of the opposite ends of the cross member laterally of the vehicle, by the end of the cross member, the frame, the trunnion plate part and the trunnion bracket, makes it possible to receive any load applied laterally of the vehicle by means of the first and second closed cross-section structures, which enhances the rigidity and improves the reliability.

Further, the fact that the trunnion bracket is integrally formed with the trunnion plate part makes it unnecessary to newly prepare separate parts, which prevents a number of parts required from being increased.

It is preferable in the trunnion suspension structure that upper surfaces of the trunnion brackets facing the lower surfaces of the opposite ends of the cross member laterally of the vehicle are respectively formed with curved concave surface parts curved downward and extending into said trunnion plate parts, a third closed cross-section structure being provided, at each of the opposite ends of said cross member laterally of the vehicle, by the end of the cross member, the frame, the curved concave surface part of said trunnion bracket and the trunnion plate part.

As a result, when the load is applied laterally of the vehicle, the load may be received not only by the first and second closed cross-section structures but also by the third closed cross-section structures, which further enhances the rigidity and further improves the reliability. Moreover, the provision of the third closed cross-section structures by forming the curved concave surface parts on the trunnion brackets makes it possible to effectively improve strength on whole mass of the trunnion brackets without unnecessarily forming thickened portions, which leads to reduction in size and weight of the trunnion brackets and reduction in cost.

If the trunnion plate parts were formed on the trunnion brackets without the curved concave surface parts, the trunnion plate parts would stand upward at substantially right angles from the upper surfaces of the trunnion brackets facing lower surfaces of the flanges of the frame, and therefore there would be a fear of stresses concentrating on bases of the upwardly standing trunnion plate parts. However, in the invention, the trunnion plate parts smoothly stand upward owing to the curved concave surface parts, which prevents concentration of stresses to the bases of the trunnion plate parts.

Advantageous Effects of Invention

A trunnion suspension structure according to the invention can exhibit excellent effects that trunnion brackets respectively mounted on webs of a frame to eliminate the necessity of any holes for fastening members on flanges of the frame, and employment of closed cross-section structures can substantially enhance whole rigidity, improve reliability, avoid increase in number of parts required through reduction in size and weight of the trunnion brackets and attain reduction in cost.

BRIEF DESCRIPTION OF DRAWINGS

FIGS. 8A and 8B are perspective views showing the trunnion bracket in the embodiment of the trunnion suspension structure according to the invention in which FIG. 8A is a view of the trunnion bracket from obliquely above and FIG. 8B is is a view of the trunnion bracket from obliquely below.

DESCRIPTION OF EMBODIMENT

Next, an embodiment of the invention will be described in conjunction with the drawings.

Figure 1:
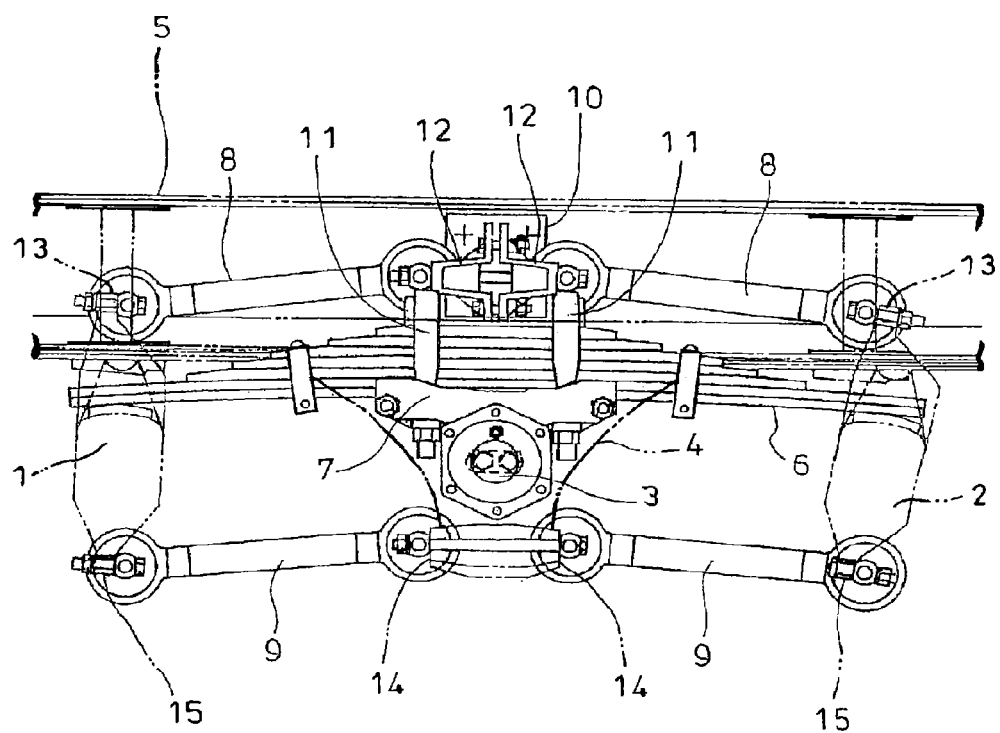
FIG. 1 is a side view showing a conventional trunnion suspension structure.
Figure 2:
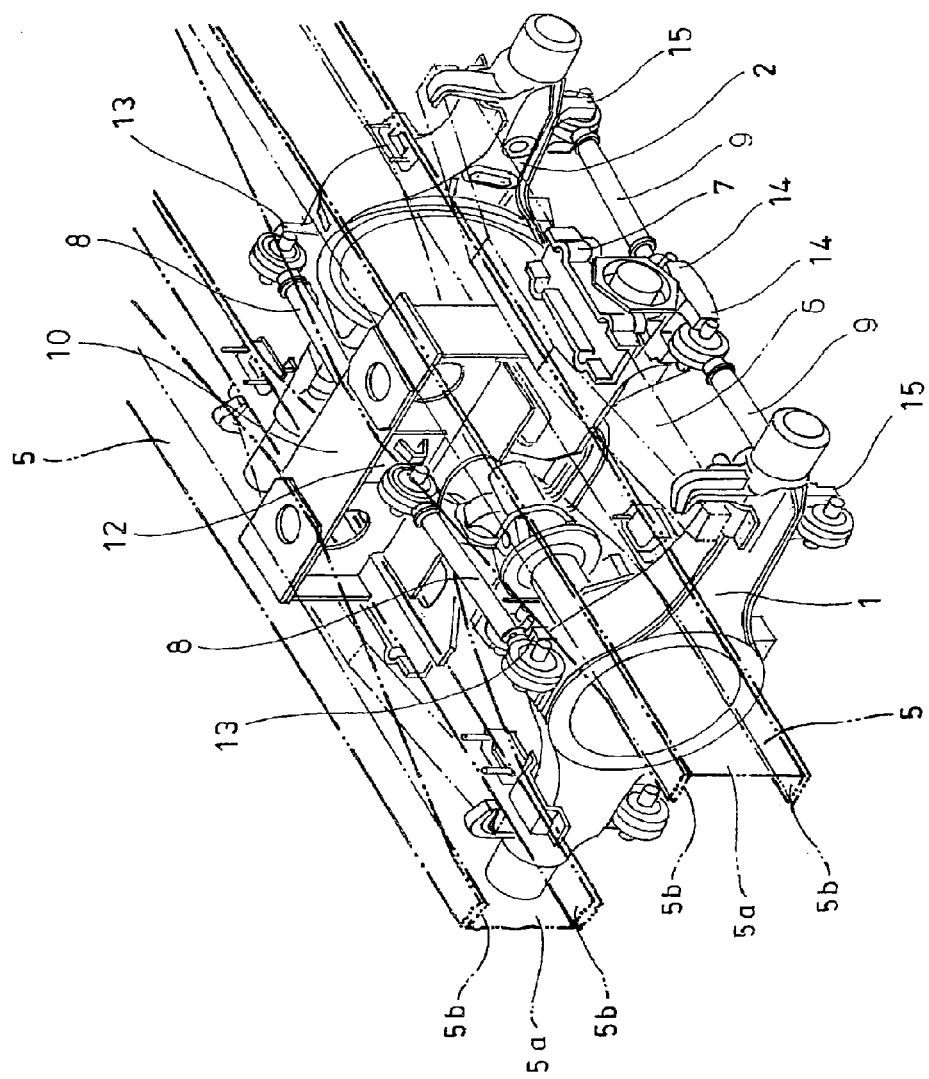
FIG. 2 is a perspective view of FIG. 1.
Figure 3:
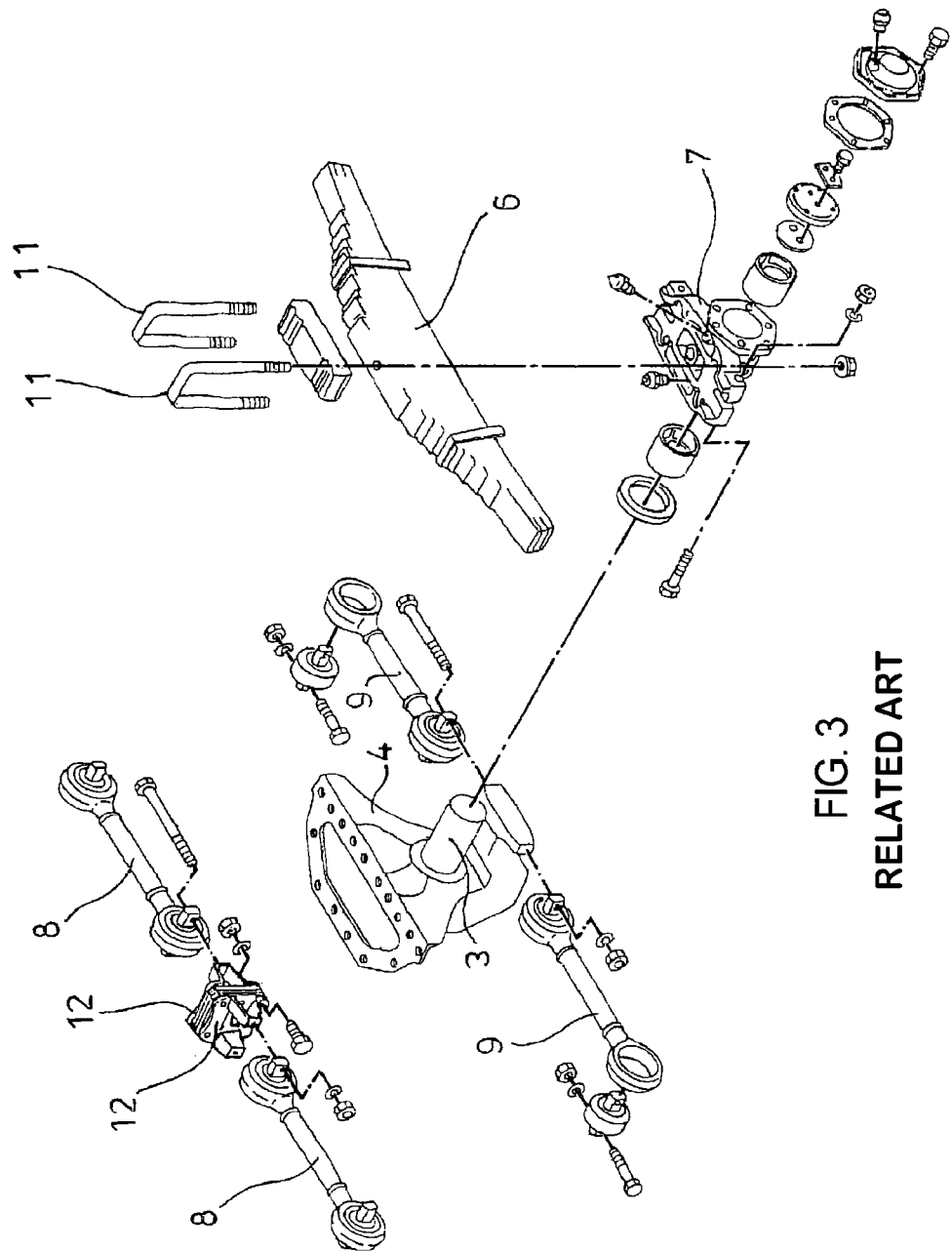
FIG. 3 is an exploded view showing important parts in FIG. 2.
Figure 4:
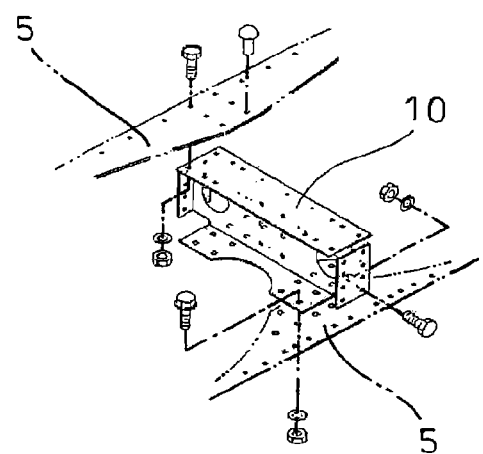
FIG. 4 is a perspective view showing particulars of the conventional cross member.
Figure 5:
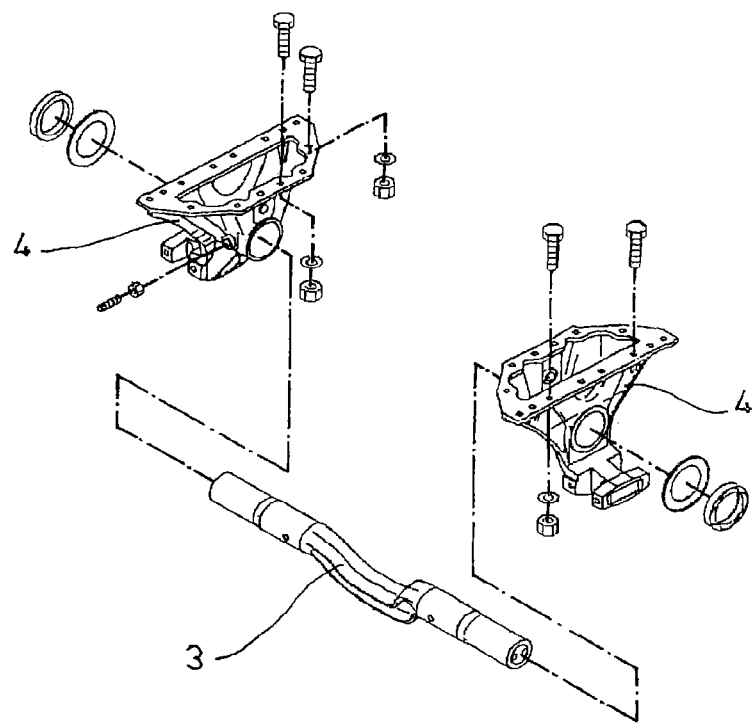
FIG. 5 is a perspective view showing particulars of the conventional trunnion brackets.
Figure 6A:
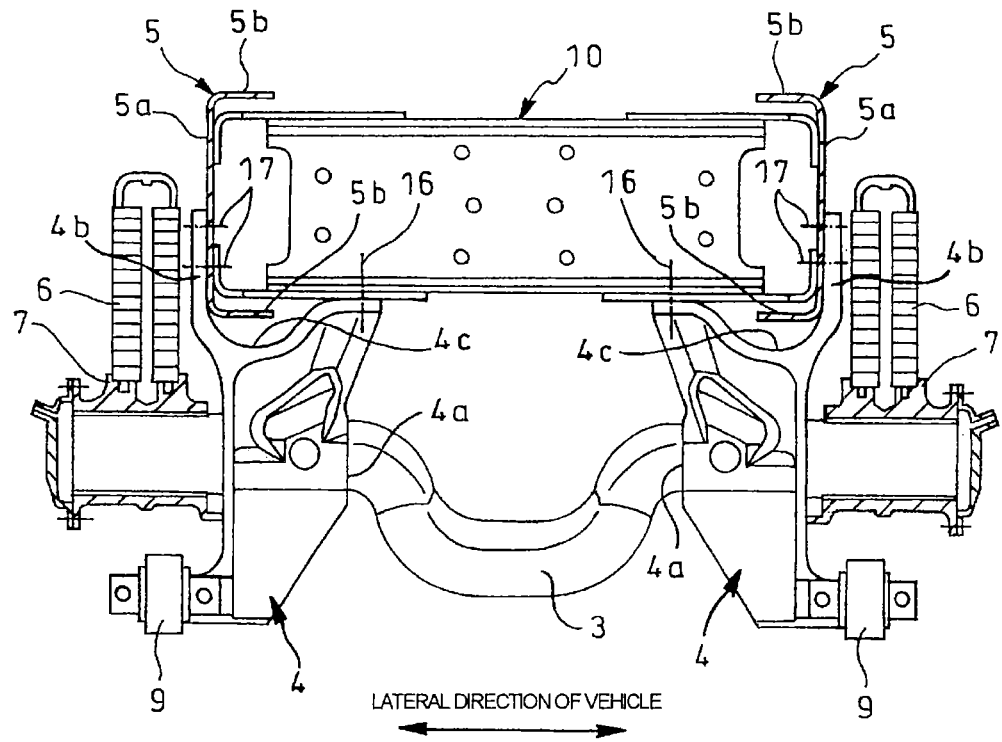
FIG. 6A is a front view showing an embodiment of a trunnion suspension structure according to the invention and FIG. 6B is a view showing first, second and third closed cross-section structures in the embodiment of the trunnion suspension structure according to the invention.
Figure 6B:
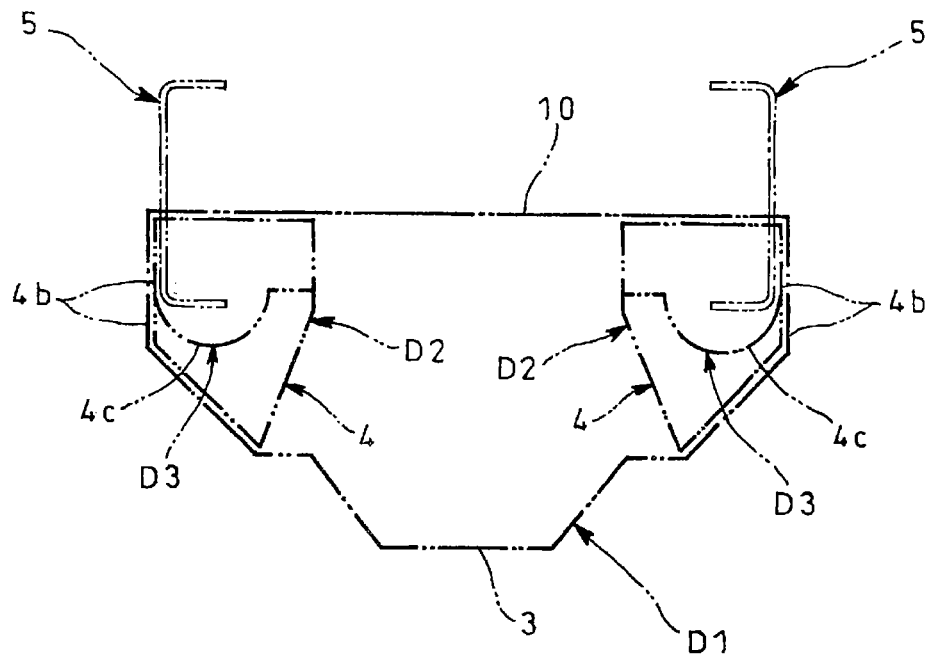
Figure 7:
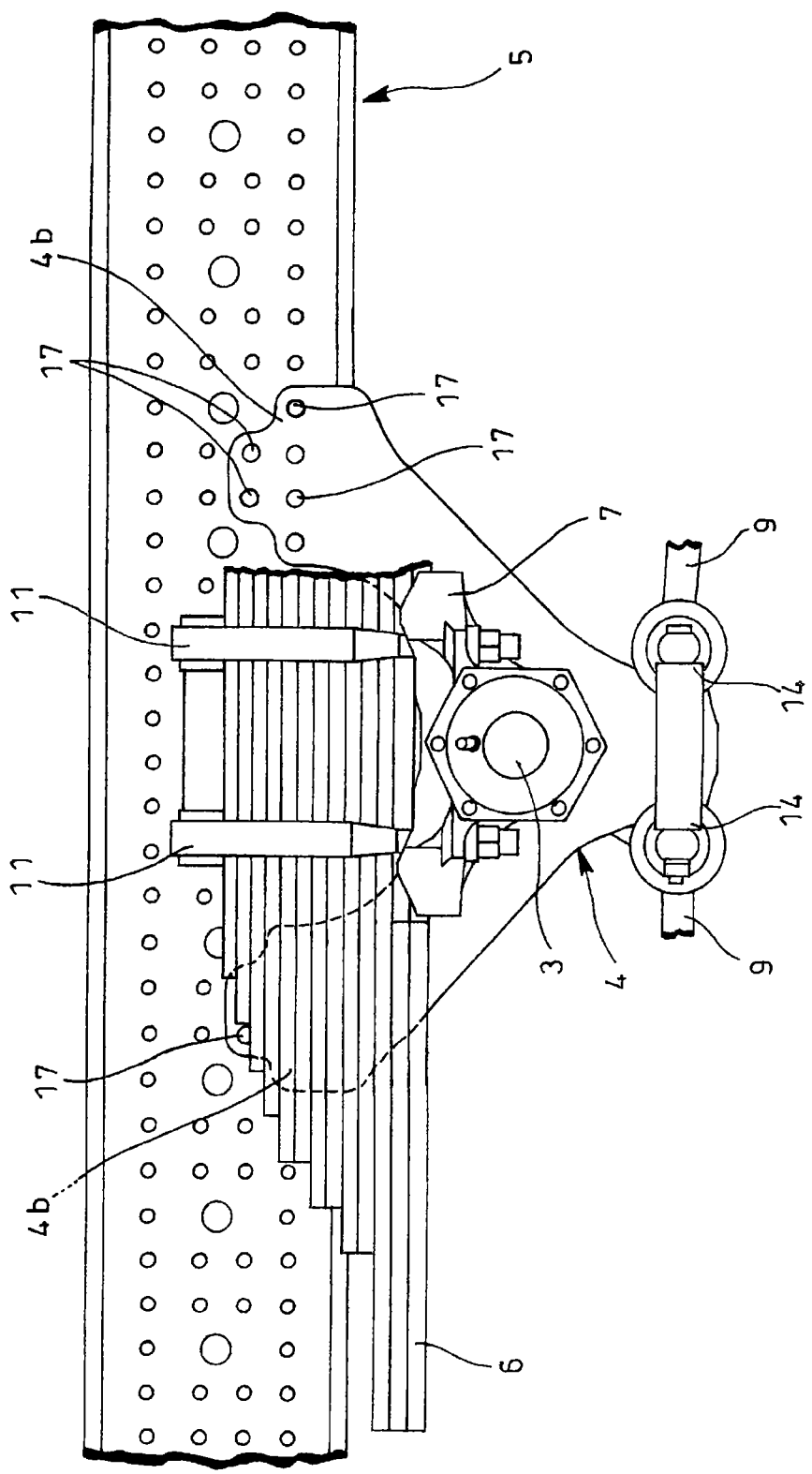
FIG. 7 is a side view showing the embodiment of a trunnion suspension structure according to the invention.
Figure 8A:
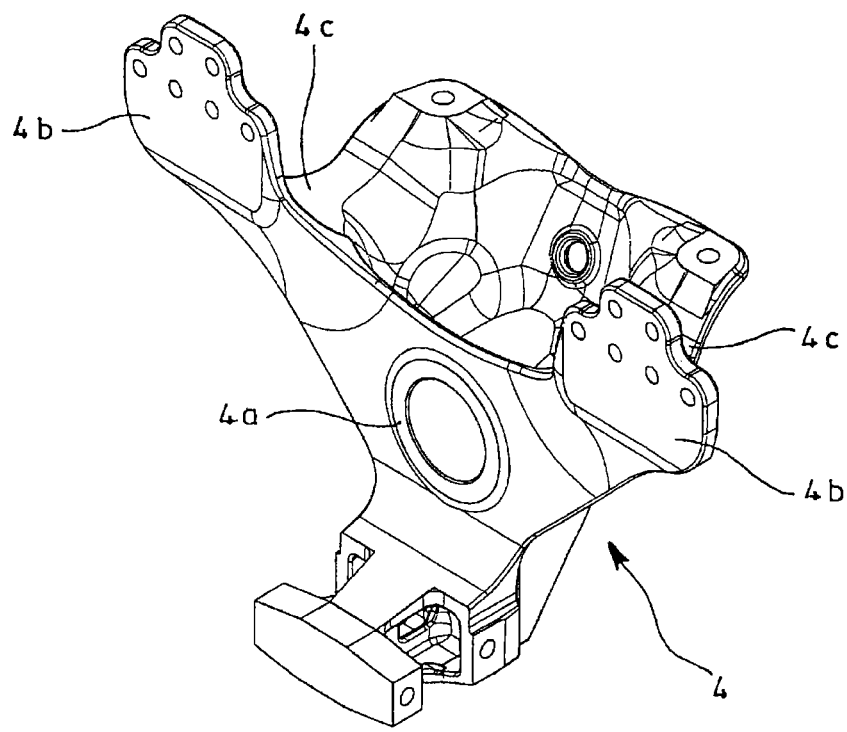
Figure 8B:
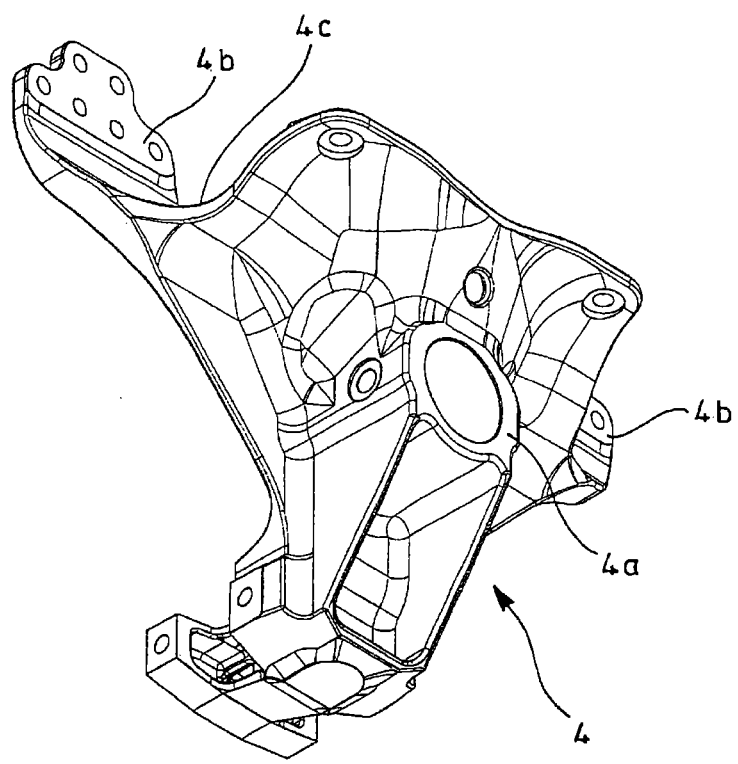

FIGS. 6-8 show the embodiment of a trunnion suspension structure according to the invention in which parts similar to those in FIGS. 1-5 are presented by the same reference numerals.

In the embodiment, each of trunnion brackets 4 mounted on lower surfaces of opposite lateral ends of a cross member 10 through fastening members 16 such as bolts and nuts is integrally formed with a trunnion plate part 4$b$ extending upward from an outer surface of the trunnion bracket 4 and mounted on an outer surface of a web 5$a$ of a frame 5 through fastening members 17 such as bolts and nuts.

Arranged unitarily between boss parts 4$a$ of the trunnion brackets 4 in bridging manner is a trunnion shaft 3; and the trunnion brackets 4 unitarily with the trunnion shaft 3 are mounted on lower surfaces of opposite ends of the cross member 10 through the fastening members 16. The trunnion plate part 4$b$ of each of the trunnion brackets 4 is mounted on an outer surface of a web 5$a$ of the frame 5 through fastening members 17. Pivotally mounted on opposite ends of the trunnion shaft 3 projecting from the boss parts 4$a$ are central portions of leaf springs 6 through pivotal bases 7, respectively.

As a result, provided longitudinally of the cross member 10 and laterally of the vehicle are a first closed cross-section structure D1 (see FIG. 6($b$)) comprising the cross member 10, the frame 5, the trunnion plate parts 4$b$, the trunnion brackets 4 and the trunnion shaft 3; and provided at each of opposite ends of the cross member 10 laterally of the vehicle is a second closed cross-section structure D2 (see FIG. 6($b$)) comprising the end of the cross member 10, the frame 5, the trunnion plate part 4$b$ and the trunnion bracket 4.

In the embodiment, further formed on upper surfaces of the trunnion brackets 4 facing to lower surfaces on opposite ends of the cross member 10 are curved concave surface parts 4$c$ curved downward and joining to the trunnion plate parts 4$b$, respectively; and provided at each of the opposite ends of the cross member 10 laterally of the vehicle is a third closed cross-section structure D3 (see FIG. 6($b$)) comprising the end of the cross member 10, the frame 5, the curved concave surface part 4$c$ of the trunnion bracket 4 and the trunnion plate part 4$b$.

Next, mode of operation of the above-mentioned embodiment will be described.

Unlike the conventional trunnion suspension structure shown in FIGS. 1-5, the fact that the trunnion plate parts 4$b$ of the trunnion brackets 4 are respectively mounted, as mentioned in the above, through fastening members 17 on the outer surfaces of the webs 5a of the frame 5 which in turn is constituted by channel steels each having the web 5 and the flanges 5b and spaced apart from each other laterally of the vehicle such that channels of the channel steels face with each other, makes it unnecessary to respectively mount the trunnion brackets 4 to the flanges of the frame 5 through fastening members such as bolts and nuts, so that there needs no more holes for the fastening members on the flanges 5a of the frame 5.

Moreover, the fact that the first closed cross-section structure D1 is provided longitudinally of the cross member 10 and laterally of the vehicle by the cross member 10, the frame 5, the trunnion plate parts 4b, the trunnion brackets 4 and the trunnion shaft 3 and the second closed cross-section structure D2 is provided, at each of the opposite ends of the cross member 10 laterally of the vehicle, by the end of the cross member 10, the frame 5, the trunnion plate part 4b and the trunnion bracket 4, makes it possible to receive any load applied laterally of the vehicle by means of the first and second closed cross-section structures D1 and D2, which enhances the rigidity and improved the reliability.

Further, the fact that the trunnion bracket 4 is integrally formed with the trunnion plate part 4b makes it unnecessary to newly prepare separate parts, which prevents a number of parts required from being increased.

Still further, the upper surfaces of the trunnion brackets 4 facing the lower surfaces of the opposite ends of the cross member 10 laterally of the vehicle are formed with curved concave surface parts 4c curved downward and extending into the trunnion plate parts 4b, and the third closed cross-section structures D3 is provided, at each of the opposite ends of the cross member 10 laterally of the vehicle, by the end of the cross member 10, the frame 5, the curved concave surface part 4c of the trunnion bracket 4 and the trunnion plate part 4b (see FIG. 6(b)). Thus, when a load is applied laterally of the vehicle, the load may be received not only by the first and second closed cross-section structures D1 and D2 but also by the third closed cross-section structures D3, which further enhances the rigidity and further improves the reliability. Moreover, the provision of the third closed cross-section structures D3 by forming the curved concave surface parts 4c on the trunnion brackets 4 makes it possible to effectively improve the strength on the whole mass of the trunnion brackets 4 without unnecessary forming thickened portions, which leads to reduction in size and weight of the trunnion brackets 4 and reduction in const.

If the trunnion plate parts 4b were formed on the trunnion brackets 4 without the curved concave surface parts 4c, the trunnion plate parts 4b would stand upward at substantially right angles from the upper surfaces of the trunnion brackets 4 facing the lower surfaces of the flange 5b of the frame 5 as is clear from FIG. 6(a), and therefor there would be a fear of stresses concentrating on bases of the upwardly sanding trunnion plate parts. However, in the embodiment, the trunnion plate parts 4b smoothly stand upward owing to the curved concave surface parts 4c, which prevents concentration of stresses to the bases of the trunnion plate parts.

Thus, the trunnion brackets 4 mounted on the webs 5a of the frame 5 to eliminate the necessity of any holes for fastening members on the flanges 5b of the frame 5, and employment of the closed cross-section structures can substantially enhance whole rigidity, improve reliability, avoid increase in number of the parts required through reduction in size and weight of the trunnion brackets 4 and attain reduction in cost.

It is to be understood that a trunnion suspension structure according to the invention is not limited to the above embodiment and that various changes and modifications may be made without departing from the scope of the invention.

INDUSTRIAL APPLICABILITY

A trunnion suspension structure according to the invention is applicable to a vehicle such as a rear two-axle heavy-duty truck.

REFERENCE SIGNS LIST 3 trunnion shaft
4 trunnion bracket
4a boss part
4b trunnion plate part
4c curved concave surface part
5 frame
5a web
5b flange
6 leaf spring
7 pivotal base
10 cross member
16 fastening member
17 fastening member
D1 first closed cross-section structure
D2 second closed cross-section structure
D3 third closed cross-section structure

The invention claimed is:
1. A trunnion suspension structure comprising:
a cross member bridging over a frame constituted by channel steels spaced apart laterally of a vehicle such that channels of said channel steels face each other,
trunnion brackets mounted laterally on lower surfaces of opposite ends of said cross member through fastening members, respectively,
a trunnion shaft arranged to bridge over boss parts of said trunnion brackets and having opposite ends respectively projecting outward from said boss parts, central portions of leaf springs being pivotably mounted on said opposite ends of the trunnion shaft through pivotal bases, respectively,
each of said trunnion brackets is integrally formed with a trunnion plate part extending upward from an outer surface of said trunnion brackets and mounted on an outer surface of a web of said frame through fastening members,
a first closed cross-section structure is provided longitudinally of the cross member and laterally and comprises the cross member, the frame, the trunnion plate parts, the trunnion brackets and the trunnion shaft,
a second closed cross-section structure is provided at each of the opposite ends of said cross member laterally and comprises the end of said cross member, the frame, the trunnion plate part and the trunnion bracket,
upper surfaces of said trunnion brackets facing the lower surfaces of the opposite ends of said cross member laterally of the vehicle are respectively formed with curved concave surface parts curved downward and extending into said trunnion plate parts, and
a third closed cross-section structure is provided, at each of the opposite ends of said cross member laterally and comprises the end of said cross member, the frame, the curved concave surface part of said trunnion bracket and the trunnion plate part.

2. The trunnion suspension structure of claim 1, wherein the trunnion brackets include a first trunnion bracket and a second trunnion bracket, the first trunnion bracket and the second trunnion bracket each including a mounting part that mounts on the lower surface of the cross member, and the respective curved concave surface parts extend between the respective trunnion plate part and the respective mounting part of each of the first and second trunnion brackets.

* * * * *